DIRECT COUPLED PROGRESSIVE STAGE PULSE COUNTER APPARATUS

Filed Jan. 17, 1958 3 Sheets-Sheet 1

WITNESSES:
Bernard R. Gieguey
James F. Young

INVENTOR
William M. Kaufman
BY R. J. Brodahl
ATTORNEY

DIRECT COUPLED PROGRESSIVE STAGE PULSE COUNTER APPARATUS

Filed Jan. 17, 1958 3 Sheets-Sheet 2

DIRECT COUPLED PROGRESSIVE STAGE PULSE COUNTER APPARATUS

Filed Jan. 17, 1958 3 Sheets-Sheet 3

3,049,628

DIRECT COUPLED PROGRESSIVE STAGE PULSE COUNTER APPARATUS

William M. Kaufman, Monroeville, Pa., assignor, by mesne assignments, to the United States of America as represented by the United States Atomic Energy Commission Filed Jan. 17, 1958, Ser. No. 709,542
1 Claim. (Cl. 307—88.5)

The present invention relates in general to electrical pulse counter apparatus and more particularly to progressively operative electrical pulse counter apparatus including a plurality of bistable counting stages which are progressively and successively operative in dependence upon the operative state of a preceding bistable counting stage.

It is an object of the present invention to provide improved progressive pulse counter apparatus that is operative with random width and/or frequency pulses and is faster and more reliable in operation.

It is a different object to provide improved pulse counter apparatus having a chain of directly coupled bistable counting stages such that the count information may be read out of any one or more of the stages as may be desired in the operation of said counter apparatus.

It is an additional object to provide improved pulse counter apparatus that is operative for fast acting parallel reset operation or slower acting successive series reset operation as may be desired.

It is a further object of the invention to provide improved pulse counter apparatus having a plurality of successively operated bistable counting stages that are directly coupled without time delaying circuit elements such as resistors and condensers.

It is a still further object of the present invention to provide improved pulse counter apparatus having a faster acting and more stable operation and including a plurality of bistable NOR element stages and operatively limited only by the inherent response characteristics of the NOR element transistor devices in each of said NOR element stages.

It is a still additional object to provide improved pulse counter apparatus having more favorable information read-out characteristics relative to auxiliary decoding apparatus operative with said counter apparatus.

Figure 1:
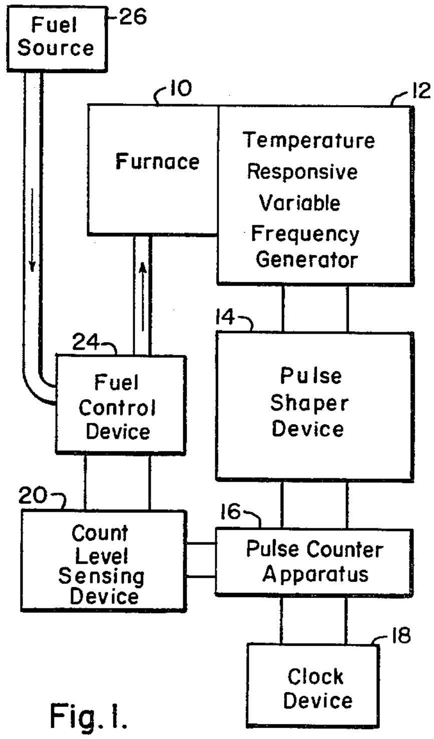
Figure 5:
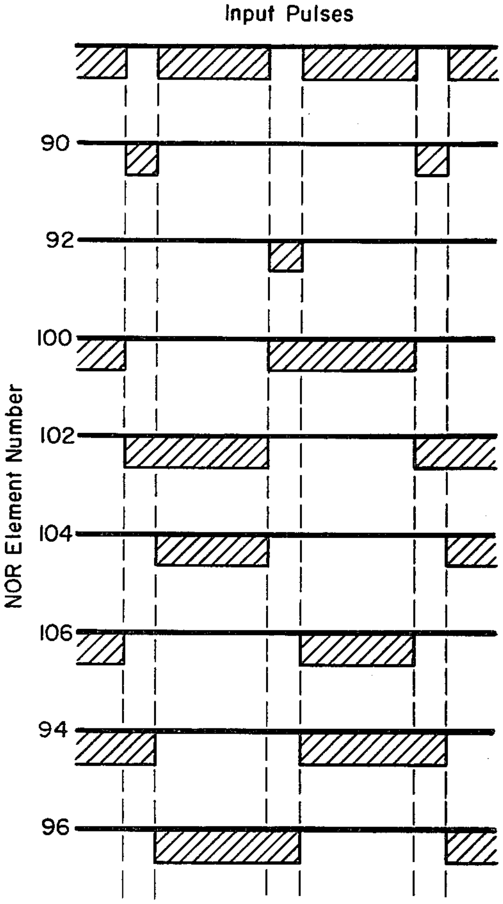
Figure 1A:
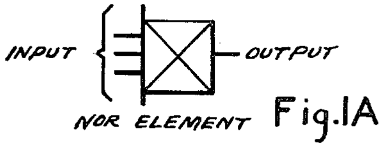
Figure 6:
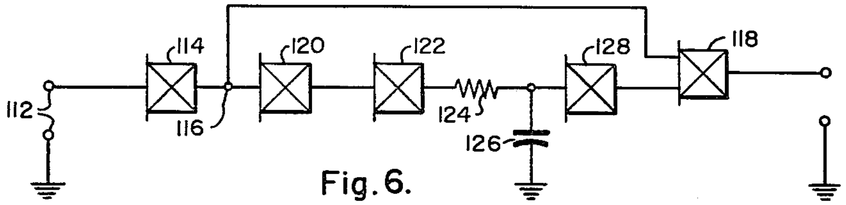
Figures 2, 3, 4:
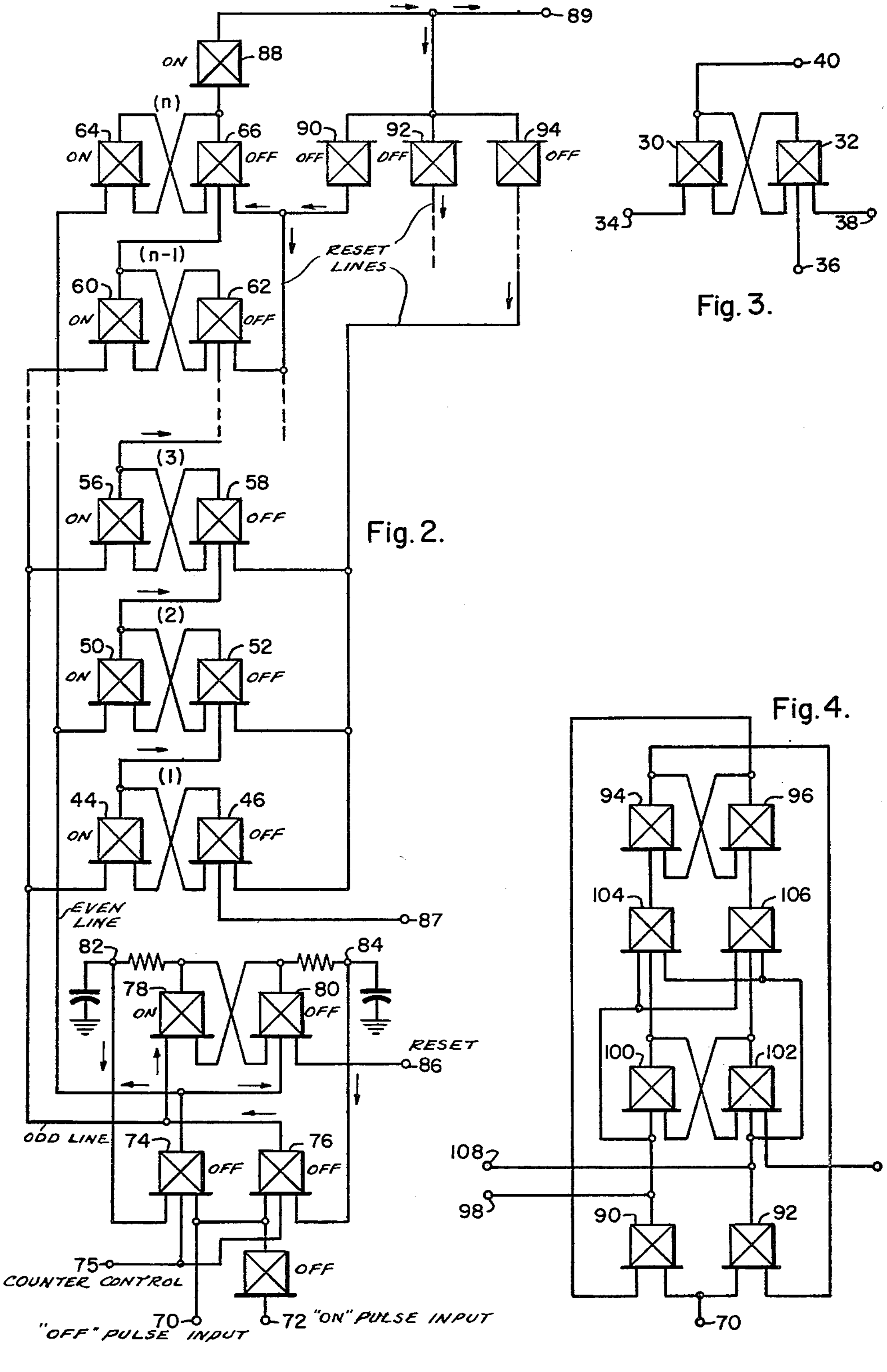
Figures 7, 8, 9:
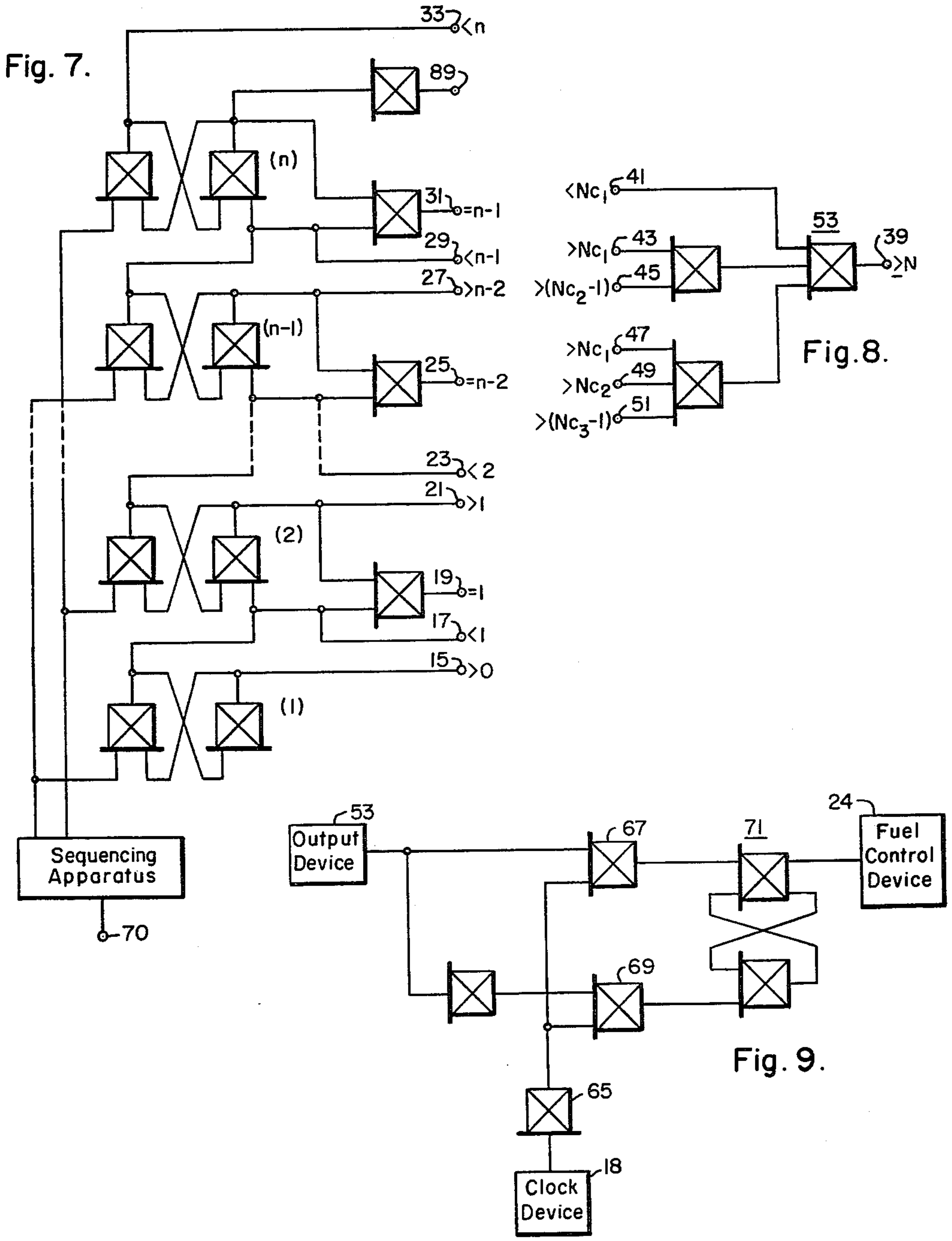

These and other objects and advantages of the present invention will become still more apparent from a study of the following description taken in conjunction with the drawings wherein:

In FIG. 1 there is shown a diagrammatic view of a furnace temperature control system including the pulse counter apparatus in accordance with the teachings of the present invention;

In FIGURE 1A there is a symbolic showing of a well known NOR element used in the present invention;

In FIG. 2 there is a schematic showing of the pulse counter apparatus in accordance with the present invention;

In FIG. 3 there is a schematic showing of one bistable counting stage of the pulse counter apparatus in accordance with the present invention;

In FIG. 4 there is shown a modification of the input pulse sequencing apparatus for use in the pulse counting apparatus of the present invention;

In FIG. 5 there is shown a curve chart illustrating the operation of the input pulse sequencing apparatus as shown in FIG. 4;

In FIG. 6 there is shown one suitable form of a pulse shaper for use with the furnace temperature control system as shown in FIG. 1;

In FIG. 7 there is shown one suitable signal comparison device for use with the present apparatus;

In FIG. 8 there is shown one suitable signal output device for use with the present apparatus; and In FIG. 9 there is shown a suitable output gating circuit for use with the present apparatus.

The electrical counter apparatus of the present invention is one that operates progressively, that is, a count is first recorded in the first stage, then with a second count signal in the first and second stage, and so on until all $n$ stages have a count recorded in them after $n$ number of counts have been received. When the $n$ number count is received it resets all the stages to their initial conditions and applies a signal which may be used by another counter.

By utilizing two line alternating inputs, with associated alternately positioned bistable stages, and only direct coupling of stages, a reliable progressive stage counter is had whose response time is only limited by the speed of the bistable stages.

In FIG. 1 there is shown an illustrative furnace temperature control system including the pulse counter apparatus of the present invention. A furnace 10 is provided with a temperature responsive variable frequency generator 12 which, for example, may include an electronic oscillator having a tuned tank circuit controlling its output frequency and including in that tank circuit an inductive member having a magnetic core that is movable in position in accordance with a bimetal temperature responsive element positioned to respond to the temperature of the furnace 10 such that the output frequency of the variable frequency generator 12 is determined by the position of the magnetic core member which in turn is dependent upon the temperature of the furnace 10. The output of the variable frequency generator 12 is applied through a pulse shaper device 14 for providing a chain of pulses having a frequency dependent upon the frequency of the variable frequency generator 12 which in turn is dependent upon the temperature of the furnace 10. A pulse counter apparatus 16 is responsive to the output pulses from the pulse shaper 14 and provides output pulses in accordance with the number of pulses received from the pulse shaper 14 over a predetermined time period as determined by a clock device 18.

FIG. 1A is a symbolic showing of a well known NOR switching element having three input terminals and a single output terminal. The NOR logic element is operative to supply no output signal, or a "zero" signal when there is an input signal present on any input terminal. However, it will supply an output, or "one," voltage on its output terminal if no signals are supplied to any of its input terminals.

The pulse counter apparatus as schematically shown in FIG. 2 includes a predetermined chain of ($n$) bistable counting stages. Each of the bistable counting stages, as individually shown in FIG. 3, includes a first NOR element 30 and a second NOR element 32. The NOR elements used in this invention are standard and well known devices in the art, and are of the type shown in the following two articles. One article is by William D. Rowe, and entitled The Transistor NOR Circuit, 1957, in the IRE Wescon Convention Record, Part IV, pages 231 through 245, and the other article is by R. A. Mathias, and entitled Static Switching Devices in Control Engineering Magazine, May 1957, pages 82 through 84. In its initial state of operation the NOR element 30 is On to provide an output signal to one input of the NOR element 32 thereby holding the NOR element 32 in its Off state of operation. In this regard it should be here noted as well known to persons skilled in this art that a NOR element is On to have an output signal when its transistor member is not conducting, and a NOR element is Off to not have an output when its transistor member is conducting and hence effectively grounds the output. A first terminal 34 is connected to supply input pulses to be counted to the NOR element 30 to cause the latter NOR element 30 to be Off and thereby change the state of operation of the bistable counting stage to its second state of operation wherein the second NOR element 32 is On and the first NOR element 30 is Off. The NOR element 32 is provided with a holding control signal through a terminal 36 and received from a preceding bisable counting stage. Also, a reset control signal may be applied through a terminal 38 as will be later explained. An output terminal 40 is provided for the counting stage such that an output signal is supplied through the terminal 40 when the first NOR element 30 is On which output signal supplied through the terminal 40 is supplied to a holding terminal similar to terminal 36 for the second NOR element of a succeeding bistable counting stage.

Relative to the counter device as shown in FIG. 2, and including a plurality of bistable counting stages of the type shown in FIG. 3, the first counting stage includes a NOR element 44 which is initially On to provide an output signal to one input of a second NOR element 46 which is initially Off. The second counting stage includes a first NOR element 50 which is initially On to provide an output control signal to one input of a second NOR element 52 which is initially Off. The third bistable counting stage includes a first NOR element 56 which initially is On and providing an output control signal to one input of a second NOR element 58 which is Off. The illustrated $n-1$ bistable counting stage includes a first NOR element 60 which is initially On and providing an output control signal to one input of a second NOR element 62 which is Off. The last and *n*th bistable counting stage includes a first NOR element 64 which is initially On to provide an output signal to one input of a second NOR element 66 which is initially Off.

Input signals or pulses to be counted are supplied to an input terminal 70, in the case of "off" input pulses, which mean ground potential input pulses, or to a terminal 72 for "on" input pulses which are input pulses at B minus potential which is in the order of negative 20 volts. These input pulses are supplied to one terminal of each of NOR elements 74 and 76.

Initially, NOR elements 74 and 76 are held in their "off" condition of operation by a normally "on" input control signal applied to the terminal 70. The NOR element 78 is initially "on" and the NOR element 80 is initially Off. Thusly, when an "off" input control pulse to be counted is supplied to terminal 70, the NOR element 76 having no input signal applied to it becomes On to provide an input signal to an odd pulse line and from there to the first NOR elements in each of the odd numbered bistable counting stages, namely NOR element 44 in the first bistable counting stages, NOR element 56 in the third bistable counting stage, and so forth. The NOR element 74 is held Off with the control signal received from the output of initially On NOR element 78. The output signal from NOR element 76 causes NOR element 78 to become Off which allows NOR element 80 to become On. However, the signal at terminal 82 remains for a time period greater than the applied input "off" pulse to be counted and applied to the terminal 70 and thereby holding the NOR element 74 in its initially Off state. The output signal received from the NOR element 76 is applied to the first NOR elements of the respective odd numbered bistable counting stages.

The next input "off" pulse to be counted will cause the NOR element 74 to become On which causes the NOR element 80 to go Off to allow the NOR elements 78 to go On. However, the NOR element 76 is held in its Off state by the signal received from the terminal 84 which has a time delay period greater than the pulse width time period of the applied input "off" pulse applied to the terminal 70. Thusly, when the NOR element 74 goes On a control signal is applied to an even pulse line and from there to the first NOR element of the respective even numbered bistable counting stages, and more specifically this control signal is applied to NOR element 50 of the second bistable counting stage, and as shown in FIG. 2 is applied to the NOR element 64 of the *n*th bistable counting stage assuming *n* to be an even number. With successively applied input "off" control pulses to be counted this alternating operation of applying the control signal first to the odd numbered bistable counting stages and then to the even numbered bistable counting stages due to the repeated operation of the NOR elements 74, 76, 78 and 80 as above described will continue.

When NOR element 76 became On to apply a control signal to the first NOR elements of the respective odd numbered bistable counting stages, the NOR element 44 of the first bistable counting stage became Off to allow the NOR element 46 to become On and to in turn apply a holding control signal to one input of the NOR element 44 to hold the NOR element 44 in its now Off state of operation. With the NOR element 44 Off the holding signal therefrom was removed from one input of the second NOR element 52 of the second bistable counting stage. Thusly, when a second input "off" pulse to be counted is applied to the terminal 70 such that the NOR element 74 becomes On this applies a control signal to an input of the first NOR element 50 of the second bistable control counting stage and thereby causes the first NOR element 50 to become Off and the second NOR element 52 is thereby made On since the output control signal from the first NOR element 50 was the only input control signal being applied to the second NOR element 52 of the second bistable counting stage.

Thusly, the bistable counting stages successively shift their state of operation from their first state of operation wherein the first NOR element is On to their second state of operation wherein the second NOR element is On. When the $n-1$ input pulse to be counted is applied to the terminal 70, it causes the $n-1$ bistable counting stage to shift to its second state of operation wherein the second NOR element 62 is On and this removed the holding signal from the input of the second NOR element 66 of the *n*th bistable counting stage. Thusly, when the *n*th input "off" pulse to be counted is applied to the terminal 70, the first NOR element 64 of the *n*th bistable counting stage became Off to cause the second NOR element 66 of the *n*th bistable stage to become On and thereby apply an output signal to the input of the NOR element 88. Thusly, the output signal is removed from the NOR elecent 88 to allow the NOR elements 90, 92 and 94 to provide an output signal and further when the NOR element 88 is made Off this corresponds to an "off" control pulse which may be applied to the input terminal 70 of a successive pulse counting apparatus similar to that shown in FIG. 2.

The output signal from the NOR element 90 is applied to one input of each of the second NOR elements of a predetermined number of bistable counting stages such as stages *n*, stages $n-1$ and two or three additional stages. The output control signal from the NOR element 92 is similarly applied to reset a predetermined number of stages, and the output control signal from the NOR element 94 is applied to the second NOR element of a predetermined initial group of bistable counting stages such as stages 1, 2 and 3 as illustrated in FIG. 2. This reset operation causes the entire chain of bistable counting stages to shift from their second state of operation to their first state of operation which is the desired initial state of operation of the counting apparatus.

The terminal 86 in FIG. 2 is provided for applying a reset pulse to the pulse sequencing control apparatus and more specifically to the NOR element 80 for causing the NOR element 80 to be Off and the first NOR element 78 to be On.

The terminal 87 is provided for applying a slower acting series resetting control pulse to the second NOR element 46 of the first bistable counting stage for causing the NOR element 46 to be Off and the NOR element 44 to be On to in turn cause the second bistable counting stage NOR element 52 to be Off and the NOR element 50 to be On to in turn successively cause each of the succeeding bistable counting stages to revert to their initial operating state with the respective first NOR element On and the second NOR element Off for each of said bistable counting stages.

In FIG. 4 there is shown a modification of the input pulse sequencing control apparatus suitable for use with the pulse counting apparatus as shown in FIG. 2 if desired. The input pulse sequencing control apparatus as shown in FIG. 4 is operative such that the NOR elements 90 and 92 are initially held in their Off states by a holding control voltage or On signal normally applied to one input of each of the NOR elements 90 and 92 through the terminal 70 when no input pulses to be counted are present. When an "off" control pulse, corresponding to a removal of the latter holding voltage or signal, is applied to the terminal 70, the NOR element 90 becomes On and the NOR element 92 is held in its Off state by the output signal from the NOR element 94 which is initially On whereas the NOR element 96 is initially Off. The output signal from the now On NOR element 90 is applied through the terminal 98 to the inputs to the odd stages 1, 3, 5 and so forth. When the NOR element 90 has an output signal it causes the initially On NOR element 100 to become Off which in turn causes the initially Off NOR element 102 to become On. For the duration of the input pulse to be counted NOR element 90 remains in the On state and the output On signal from NOR element 90 is applied to an input terminal of both NOR element 104 and NOR element 106 causing NOR element 104 and NOR element 106 to be in their Off state. When the input pulse to be counted departs, the NOR element 90 switches to its Off state and the NOR elements 104 and 106 are no longer held Off by the output signal of NOR element 90. Since the NOR element 100 has ceased to be On the NOR element 104 becomes On which causes the NOR element 94 to go Off. When the NOR element 102 becomes On it causes the NOR element 106 to remain Off which causes the NOR element 96 to be On. Now the output signal from the NOR element 96 is fed back to an input of the NOR element 90. However, the output signal from the now On NOR element 102 holds the NOR element 100 in its Off state of operation. When a second "off" pulse to be counted is applied to the input pulse terminal 70 the NOR element 92 becomes On, since there is no holding signal from the now Off NOR element 94 and this applies a control signal through the terminal 108 to the even numbered bistable counting stages namely the second, fourth, sixth, and so forth, counting stages. When the NOR element 92 becomes On this causes the NOR element 102 to be Off to in turn allow the NOR element 100 to become On. For the duration of the second input pulse to be counted NOR element 92 remains in the On state and the output On signal from NOR element 90 is applied to an input terminal of both NOR element 104 and NOR element 106 causing NOR element 104 and NOR element 106 to be in their Off state. When the second input pulse to be counted departs, the NOR element 92 switches to its Off state and NOR element 104 and NOR element 106 are no longer held Off by the output signal of NOR element 92. The output On signal of NOR element 100 causes NOR element 104 to remain Off, but the output of NOR element 102 is Off causing NOR element 106 to come On. The NOR element 106 becomes On to cause the NOR element 96 to be Off and thereby remove the holding signal from the second input of the NOR element 94. This causes the NOR element 94 to now apply a control signal to one input of the NOR element 92 and become Off.

The curve chart as shown in FIG. 5 shows this operation of the input pulse sequencing control apparatus as shown in FIG. 4.

In FIG. 6 there is a schematic showing of a pulse shaping apparatus suitable for use as the pulse shaper 14 shown in FIG. 1. A suitable alternating current signal is applied between the input terminals 112. This is supplied to the first NOR element 114. The output of the NOR element is a rectangular wave depending upon the resultant alternate On and Off operation of the NOR element 114. At a circuit junction 116 the output signal from the NOR element 114 is split in two paths, with one path being directly connected to the input of the last NOR element 118 and the other path passing through a pair of NOR elements 120 and 122 provided for isolation and through a delay network including a resistor 124 and capacitor 126. An additional NOR element 128 is provided to supply the desired output signal delayed relative to the signal received from the NOR element 114. Thusly, the NOR element 118 will provide an output signal only when no signal appears at either of its two inputs. Thusly, there is provided a brief time interval in each cycle during which neither input receives an "on" or input signal because of the delay introduced by the delay circuit including the resistor 124 and the capacitor 126. Thusly, the pulse shaper is operative to provide this pulse output signal with a pulse width depending upon the time delay period introduced by the resistor 124 and capacitor 126. Thusly, it is substantially independent of input frequency.

In the apparatus as shown in FIG. 1 the temperature responsive variable frequency generator is operative to provide a frequency modulated sine wave which is converted into a pulse rate modulated signal by a pulse shaping network such as shown in FIG. 6. The pulses are then counted by the pulse counter apparatus 16 during a reference time period. At the end of a counting interval the clock device 18 stops the pulse counter apparatus 16 and the count level is sensed by the sensing device 20 for controlling the operation of the fuel control device 24 as may be desired.

In the operation of the pulse counter apparatus as shown in FIG. 2 the input pulses to be counted are alternately supplied respectively to the odd numbered bistable counting stages and the even numbered bistable counting stages. The counter apparatus in its initial state is operative such that the first NOR element of each bistable counting stage is On and the second NOR element is Off. The first input pulse is then delivered to all of the odd numbered stages. However, none of the odd numbered stages with the exception of the first such stage can change state for all of the others are held in the latter described first state of operation by a holding control signal received from the preceding even numbered stage that is in its first state of operation. Since the first bistable counting stage is not preceded by an even numbered stage, it can then change from its first state of operation to its second state of operation whereby the NOR element 46 is On and the NOR element 44 is Off. When the first bistable counting stage changes its state of operation, it removes the holding control signal from the NOR element 52 of the second bistable counting stage. Therefore, upon arrival of the second input pulse to be counted the second bistable counting stage will change its state of operation from its first state of operation to its second state of operation wherein the NOR element 52 is On and the NOR element 50 is Off. Thusly, when the second bistable counting stage changes its state of operation it removes the holding control signal from the input to the NOR element 58 in the third bistable counting stage.

Thus with the arrival of each succeeding input pulse to be counted the bistable counting stages change from their first state of operation to their second state of operation in successive sequence. After the $n$th of last input pulse to be counted is received the last stage in the chain of bistable counting stages will change its state of operation to cause an output signal to be sent from the NOR elements 90, 92 and 94 for resetting all of the bistable counting stages to their first state of operation.

Since NOR element 66 receives a resetting signal from NOR element 90, NOR element 66 goes Off and NOR element 64 comes On causing NOR element 88 to come On and thusly removing the reset signal. Thusly the output signal of NOR element 88 is an Off pulse which can be applied through the output terminal 89 to any succeeding chains of similar bistable counting stages or to an output recorder or decoding device as may be desired. For example, if three ten-stage chains of bistable counting stages, such as shown in FIG. 2 were connected together, and if the output or reset pulses of the preceding chains of such stages were used as input pulses to succeeding chains of such stages, then this set of three decade counting stages could be used to count from zero to 999.

In FIG. 7 there is shown a comparison device for comparing the operating states of the respective counting stages for providing output control signals in accordance with the count level of a counter apparatus having ($n$) counting stages. More specifically, as the respective counting stages switch to their second state of operation, the output terminals of the comparison device provide control signals to indicate the count level or how many of the counting stages has so switched their operative state. The terminal 15 has an output control signal when the first counting stage is operative in its second state of operation, indicating that at least one input pulse has been applied to terminal 70. The terminal 17 has an output signal when the first stage is operating in its first state of operation, indicating that less than one input pulse to be counted has been applied to terminal 70. The terminal 19 has an output signal when only one input pulse has been applied to terminal 70. The terminal 21 has an output signal when more than one input pulse has been applied to terminal 70. The terminal 23 has an output signal when less than two input pulses have been applied to terminal 70. The terminal 25 has an output signal only when ($n$—2) such input pulses have been applied to terminal 70 where $n$ is the number of counting stages. The terminal 27 has an output signal when more than ($n$—2) such input pulses have been received at terminal 70. The terminal 29 has an output signal when less than ($n$—1) input pulses have been so received. The terminal 31 has an output signal only when ($n$—1) such input pulses have been received. The terminal 33 has an output signal when less than ($n$) such input pulses have been received. More specifically, if it were desired to maintain the furnace 10 temperature at one temperature unit, for example one degree Fahrenheit or one unit of a hundred degrees, or the like, the terminal 21 of the comparison device shown in FIG. 7 could be connected to the fuel control device 24. Then as long as the furnace temperature was less than one such temperature unit, the fuel control device 24 would keep supplying fuel to the furnace 10 until the furnace temperature reached the desired predetermined one unit and the supply of fuel would then be discontinued until the furnace temperature was again less than said one unit.

Relative to the output device 53 shown in FIG. 8, the terminal 39 may be made to have an output signal when the count level is greater than a predetermined level is supplied to input terminals 41, 43, 45, 47, 49 and 51. The output device shown in FIG. 8 can be used with a group of decade counter devices, such as shown in FIGURE 2, as follows. If a furnace temperature of 782 degrees F. is desired, then three decade counters, as shown in FIGURE 2 where $n$ equals ten, would be required. A comparison device as shown in FIG. 7 would be provided for each of these decade counters, where $n$ equals ten.

The terminal 41 of the output device shown in FIG. 8 would be connected to the less than seven ($Ne_1$=7) terminal of the comparison device for the hundredths or third decade counter. The terminals 43 and 47 would be connected to the greater than seven ($Ne_1$=7) terminal of the same comparison device. The terminal 45 would be connected to the greater than seven ($Ne_2$=8) terminal of the comparison device for the tens or second decade counter. The terminal 49 would be connected to the greater than eight ($Ne_2$=8) terminal of the latter comparison device and the terminal 51 would be connected to the greater than one ($Ne_3$=2) terminal of the comparison device for the units or first decade counter device.

It should be here understood that the comparison device shown in FIGURE 7 and the output device shown in FIGURE 8 are merely illustrative of suitable prior art logic information read-out devices that may be employed with the counter apparatus in accordance with the present invention.

The count level sensing device 20 shown in FIGURE 1 includes the output device as shown in FIG. 8 and the comparison device as shown in FIG. 7 and can be predetermined or prearranged as above set forth to sense the counter level and thereby control the furnace temperature by controlling the operation of the fuel control device 24.

In FIG. 9 there is shown a suitable output gating circuit that can be used to isolate the fuel control device 24 from the counters and their attendant comparison and output devices during count intervals. The clock device 18 provides a control pulse to the output gating circuit shown in FIGURE 9 to permit logic information read-out to the fuel control device 24, by removing the holding output signal from NOR element 65 from one input of the respective NOR elements 67 and 69. This then allows during the so provided read-out time period for the operative state of the memory flip-flop device 71 to correspond with the control signal from the output device 53.

The clock device 18 also provides a count suppression control signal to the terminal 75 shown in FIG. 2 to provide a predetermined counting interval of time as may be desired and well known to persons skilled in this art. During the counting suppression interval the output gating control pulse signal is supplied to the NOR element 65 shown in FIG. 9 and then the reset control pulse is applied to terminals 86 and 87 shown in FIGURE 2, by the clock device 18.

It should be understood that a NOR element as such is conductive when it is providing an output signal and its transistor member is not conducting; the NOR element as such is not conductive when it is not providing an output signal as determined by its transistor member being in its not conducting operative condition.

It should be here noted that the present patent application is related to a copending patent application, filed January 17, 1958, S.N. 709,541, by W. M. Kaufman and T. A. Jeeves, entitled Electrical Pulse Counter Apparatus, and assigned to the same assignee as is the present application.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

In pulse counting apparatus, the combination comprising, ($a$) a chain of stages, each stage including:

(1) a first NOR element, (2) a second NOR element, (3) cross coupling means directly connecting the output of said first NOR element to a first input of said second NOR element and the output of said second NOR element to a first input of said first NOR element;

(*b*) means directly connecting the output of the first NOR element of each stage in the chain to a second input of the second NOR element of each subsequent stage in the chain;

(*c*) an odd pulse line connected to a second input of each first NOR element of the odd stages in said chain;

(*d*) an even pulse line connected to a second input of each first NOR element of the even stages in said chain;

(*e*) input pulse sequencing means functioning to alternately actuate said odd and even lines in response to a chain of pulses applied to an input thereof; and (*f*) a reset means connected to a third input of each of said second NOR elements.

References Cited in the file of this patent

UNITED STATES PATENTS

| | | |
|---|---|---|
| 2,774,868 | Havens | Dec. 18, 1956 |
| 2,820,153 | Woll | Jan. 14, 1958 |
| 2,853,238 | Johnson | Sept. 23, 1958 |
| 2,888,556 | Richards | May 26, 1959 |

OTHER REFERENCES

Proceedings of the IRE; vol. 36, No. 8, August 1948, pages 1030 to 1034, "Megacycle Stepping Counter" by C. B. Leslie (FIG. 2 at page 1031 relied on).

"Arithmetic Operations in Digital Computers" by Richards, pp. 207–8, Van Nostrand, 1955.

Mathias: "Static Switching Devices," Control Engineering Magazine, May 1957, pages 82–84.